(12) United States Patent  (10) Patent No.: US 7,705,277 B2
Noble et al.  (45) Date of Patent: Apr. 27, 2010

(54) SUN TRACKING SOLAR PANELS

(75) Inventors: Robert L. Noble, Encinitas, CA (US);
William S. Adelson, Ramona, CA (US)

(73) Assignee: Envision Solar, LLC, San Diego, CA (US)

( * ) Notice: Subject to any disclaimer, the term of this patent is extended or adjusted under 35 U.S.C. 154(b) by 0 days.

(21) Appl. No.: 12/025,192

(22) Filed: Feb. 4, 2008

(65) Prior Publication Data

US 2009/0194669 A1 Aug. 6, 2009

(51) Int. Cl.
*G01C 21/02* (2006.01)
*H01J 5/16* (2006.01)
*H01J 40/14* (2006.01)

(52) U.S. Cl. .................... 250/203.4; 52/173.3; 250/234

(58) Field of Classification Search .................. 250/234, 250/203.4; 52/173.3
See application file for complete search history.

(56) References Cited

U.S. PATENT DOCUMENTS

| 4,418,684 | A | 12/1983 | Sanders et al. |
| 6,421,966 | B1 | 7/2002 | Braunstein et al. |
| D496,248 | S | 9/2004 | Liebendorfer |
| D496,249 | S | 9/2004 | Liebendorfer |
| 2003/0015636 | A1 | 1/2003 | Liebendorfer |
| 2004/0163338 | A1 | 8/2004 | Liebendorfer |
| 2006/0011783 | A1* | 1/2006 | Bang et al. .................. 244/168 |

* cited by examiner

*Primary Examiner*—Seung C Sohn
(74) *Attorney, Agent, or Firm*—Nydegger & Associates

(57) ABSTRACT

A system is provided for maximizing solar energy utilization by moving a solar panel to track movement of the sun from sunrise to sunset. Preferably, the solar panel is inclined from the horizontal plane by a fixed angle of about ten degrees. And, movements of the solar panel are accomplished, daily, in accordance with a programmed schedule of consecutive cycles. In this schedule, each cycle has a start time (i.e. sunrise) and a start point that is determined by the sun's direction from the solar panel.

15 Claims, 2 Drawing Sheets

SUN TRACKING SOLAR PANELS

FIELD OF THE INVENTION

The present invention pertains generally to systems that employ energy converting units, such as photovoltaic cells, to harness solar energy. More particularly, the present invention pertains to systems in which energy converting units are mounted on solar panels that track movement of the sun during daylight hours. The present invention is particularly, but not exclusively useful as a system of solar panels wherein the panels are inclined relative to the horizontal plane, and are moved in accordance with a programmed daily schedule to maximize solar energy utilization.

BACKGROUND OF THE INVENTION

The angle at which solar radiation is incident on an energy converting unit (e.g. a photovoltaic cell) can significantly affect the unit's ability to convert solar energy into electrical energy. Optimally, the angle of incidence for solar radiation will be ninety degrees (i.e. an energy converting unit is oriented so solar radiation is directed at a right angle, perpendicular to the surface of the energy converting unit). To do this, specific tracking movements of the energy converting unit during daylight hours are required. This, however, may be difficult or impractical to achieve.

Although the efficiencies of energy converting units are diminished as the angle of incidence deviates from perpendicular; with only small deviations, the diminution of efficiency is minimal. On the other hand, with relatively large deviations from the perpendicular, the diminished effect quickly becomes significant. To minimize this loss and, conversely, to maximize system efficiency, the structure on which the energy converting unit is mounted (e.g. a solar panel) must effectively track movement of the sun. Operationally, this must be done in compliance with two considerations. These are: azimuth and elevation.

In order to effectively track movement of the sun, it is clear that both the azimuthal movements and elevation considerations for a solar panel are important. For example, the panel must first be pointed in the proper azimuthal direction (i.e. toward the sun). Secondly, with azimuth established, the panel must then be inclined in elevation to optimize (maximize) the angle of incidence. On the first point (i.e. azimuthal tracking), in comparison with a stationary solar panel it has been determined that the overall efficiency of energy converting units can be improved by around twenty percent when the solar panel azimuthally tracks the sun. On the second point, for latitudes of the United States, in comparison with a horizontally oriented solar panel, an inclination angle for elevation of about ten degrees has been determined to be generally optimal.

In light of the above it is an object of the present invention to provide a system for moving an energy converting unit that azimuthally tracks the sun with a fixed elevation angle, to thereby maximize solar energy utilization. Another object of the present invention is to provide a system for moving an energy converting unit in accordance with a programmed schedule of cycles which tracks the sun during daylight hours and recycles the system at nighttime in preparation for a subsequent cycle the next day. Yet another object of the present invention to provide a system for moving an energy converting unit that is easy to use, is relatively simple to manufacture, and is comparatively cost effective.

SUMMARY OF THE INVENTION

In accordance with the present invention, an apparatus is provided for moving energy converting units to track the daytime movement of the sun. This is done for the purpose of maximizing solar energy utilization. In detail, the apparatus includes a plurality of solar panels, with each solar panel having a substantially flat, rectangular shaped surface on which a plurality of energy converting units (e.g. photovoltaic cells, solar-thermal cells, or concentrating cells) are mounted. Structurally, the solar panel defines a directional plane that is perpendicular to its flat surface. Also, a central axis is defined for the solar panel that lies in the directional plane and passes through a support point on the solar panel.

A mount is provided for supporting the solar panel. Specifically, the mount supports the solar panel at its support point, with the flat surface of the solar panel inclined relative to a terrestrial horizon. This inclination is fixed at an angle "$\alpha$" that can be anywhere in a range of about eight to thirty-five degrees ($\alpha=8°$ to $35°$). Preferably, however, for latitudes in the United States, $\alpha=20°$. Importantly, the support point is established and positioned on the solar panel so the solar panel exerts a substantially zero moment on the mount.

For a preferred embodiment of the present invention the mount is essentially a pole having a base that is anchored to the ground. The other end of the pole then extends vertically upward. A cuff that is formed with a first bearing surface is attached to the pole near its extended end. Additionally, a sleeve is provided that is formed with a channel for receiving the exposed end of the pole. Thus, the sleeve fits over the end of the pole to establish contact with the cuff. For this contact, the sleeve is formed with a second bearing surface that is positioned against the first bearing surface of the cuff. This contact between the respective bearing surfaces then permits a rotation of the sleeve about the pole and, thus, about the central axis. Further, a truss structure can be affixed to the solar panel and engaged with the sleeve to hold the solar panel on the pole.

A motor is provided for the apparatus of the present invention to rotate the panel on the mount about the central axis. As implied above, the central axis passes through the support point on the solar panel and is substantially perpendicular to a horizontal plane defined by the terrestrial horizon. A controller is also provided for controlling rotation of the panel through successive cycles in accordance with a programmed schedule.

During each cycle of the programmed schedule, between sunrise and sunset of each day, the controller maintains the sun at a position substantially in the directional plane. Within every 24-hour period, each cycle has a start time established by the time of sunrise. Each cycle also identifies a time interval "$\Delta t$", extending from sunrise to sunset, during which the sun is tracked. Further, each cycle has a recycle phase wherein the solar panel is returned to an appropriate start point for a subsequent cycle. As intended for the present invention, the recycle phase is accomplished after sunset, during nighttime. And, the cycles are consecutive with its subsequent cycle that begins at sunrise on the immediately following day.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
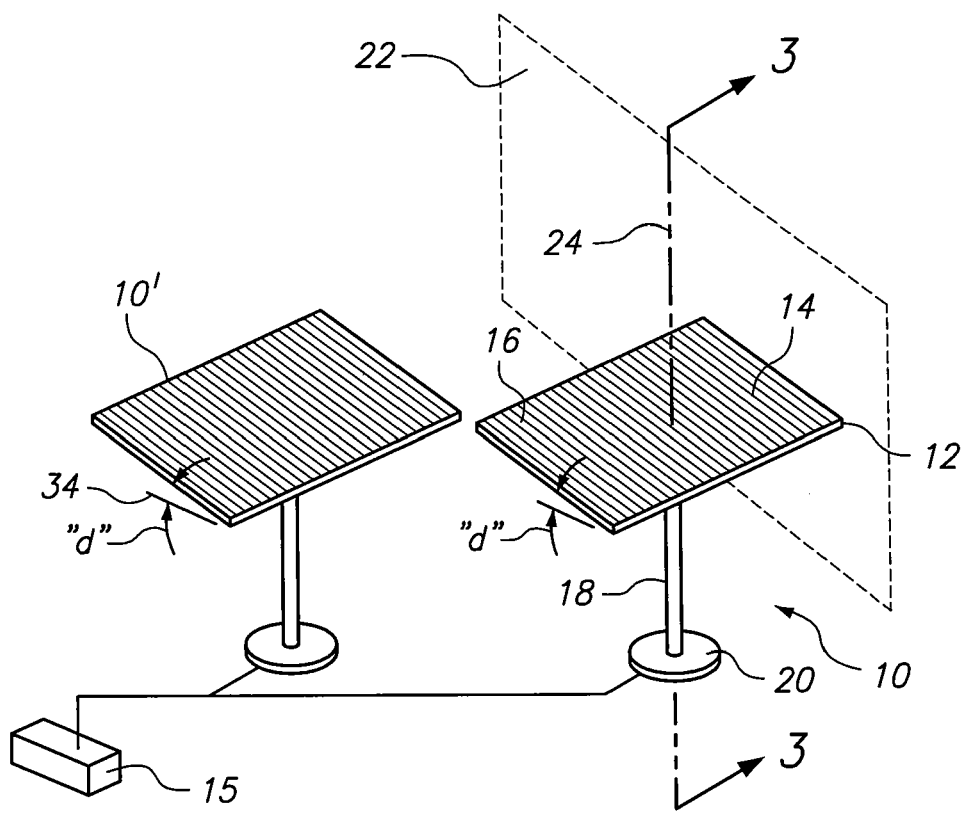
FIG. 1 is a perspective view of a plurality of apparatuses arranged in an array in accordance with the present invention.

Referring initially to FIG. 1, an apparatus in accordance with the present invention is shown, and is generally designated 10. Another apparatus 10' is shown in FIG. 1 to indicate that a plurality of apparatuses 10 can be combined together in a functional array. As shown in FIG. 1, each apparatus 10 includes a solar panel 12 that supports a plurality of energy converting units 14. For the present invention, the preferred energy converting unit 14 is a photovoltaic cell of a type well known in the pertinent art. The energy converting unit 14, however, may be of any type device that is useful for converting solar energy into electrical energy for use at a utility site 15 such as thermal-solar cells or concentrating cells.

FIG. 1 further indicates that the energy converting units 14 are mounted on a surface 16 of the solar panel 12. Additionally, FIG. 1 shows that the solar panel 12 is supported on a pole 18 that is somehow anchored to the ground by a base 20. For purposes of the present invention, the surface 16 of solar panel 12 is preferably flat, and is substantially rectangular shaped. With the above in mind, it is to be appreciated that the surface 16 of solar panel 12 will define a directional plane 22 that is oriented perpendicular to the surface 16. Further, a central axis 24 can also be defined for the solar panel 12 such that the central axis 24 lies in the directional plane 22 and is aligned with the pole 18. For purposes of the present invention, this effectively establishes a vertical orientation for the central axis 24.

Figure 2:
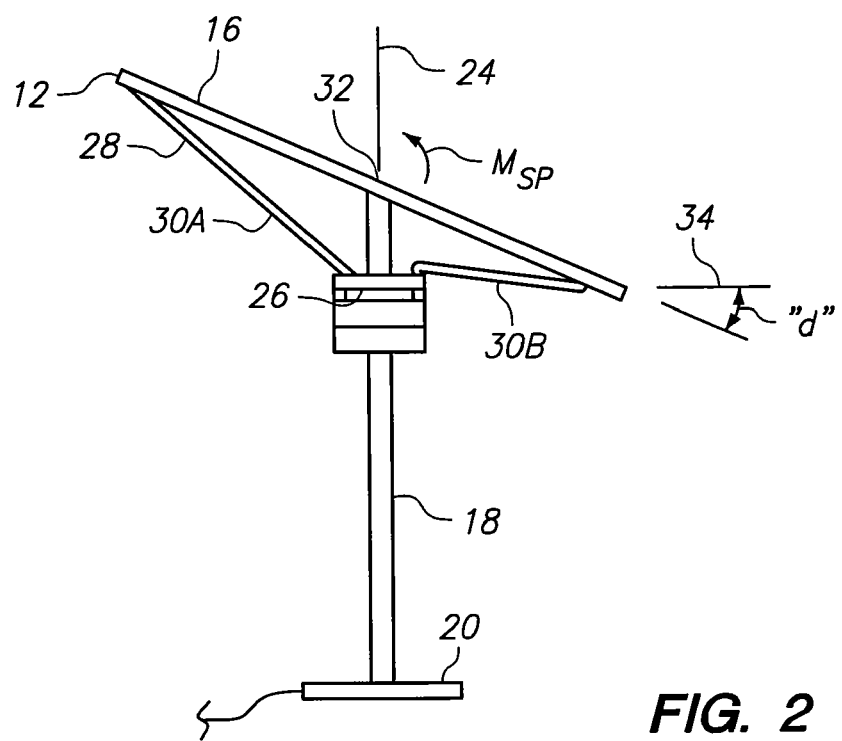
FIG. 2 is a side elevation view of an apparatus.

Additional structural aspects of the present invention will be best appreciated with reference to FIG. 2 where it can be seen the solar panel 12 is supported on a mount 26. For some embodiments of the apparatus 10, the mount 26 may include a truss-like structure 28 with braces 30 that will be used to add stability to the solar panel 12 (e.g. braces 30a and 30b). Importantly, the solar panel 12 is to be supported by the mount 26 with the central axis 24 passing through a support point 32 on the panel 12. Recall, the central axis 24 is aligned with the pole 18. Specifically, within this geometry, solar panel 12 needs to be supported so that, in a "no wind" condition, the moment "$M_{sp}$" acting on the mount 26 is substantially equal to zero (i.e. there is minimal, if any, moment about the support point 32 where the mount 26 interacts with the solar panel 12 {$M_{sp}$=0}). Further, this structural relationship between the mount 26 and solar panel 12 (i.e. $M_{sp}$=0) must account for the fact the solar panel 12 is to be inclined relative to a horizontal plane 34 by an angle "α" and the impact this inclination will have for structural loadings in a windy condition. As envisioned for the apparatus 10, the inclination angle "α" will be generally within a range of 8° to 35° (for latitudes of the United States). Preferably, α=10° or 20°.

The importance of $M_{sp}$=0 in a static (i.e. "no-wind" condition) is underscored by the size and structural configuration of the panels 12. As envisioned for a typical apparatus 10, the surface 16 of the solar panel 12 will most likely have an area somewhere in a range from around nine hundred and twelve square feet (912 ft$^2$ for a 24'×38' panel 12), to around one thousand six hundred square feet (1,600 ft$^2$ for a 40'×40' panel 12). Wind loadings on structures this size can be considerable. Moreover, they can only aggravate any pre-existing $M_{sp}$.

Figure 3:
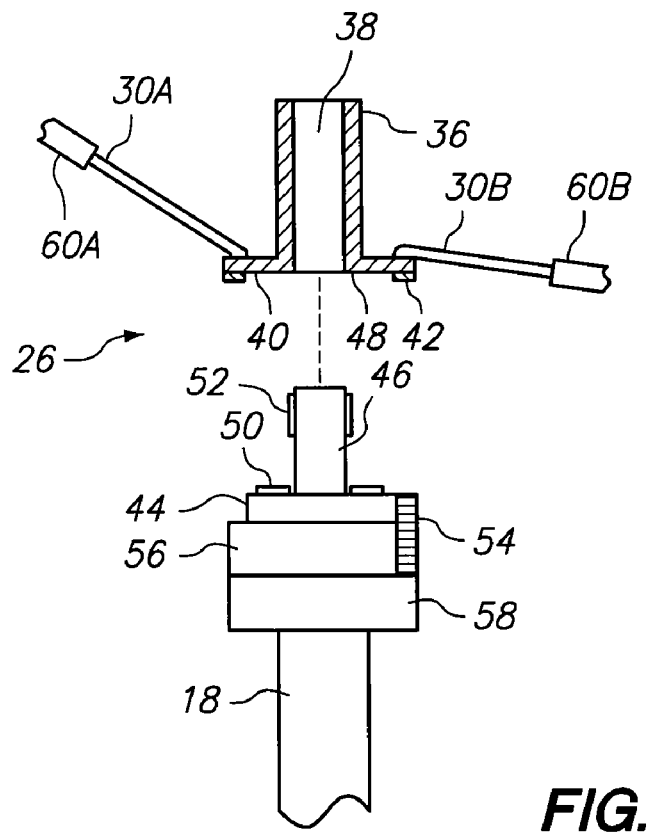
FIG. 3 is an exploded partial cross-section view of the mount for the apparatus of the present invention, as seen along the line 3-3 in FIG. 1.

The structural details of mount 26 will be best appreciated with reference to FIG. 3. There it will be seen that the mount 26 includes a sleeve 36. More specifically, the sleeve 36 is generally a hollow cylinder formed with a channel 38. The sleeve 36 also has a flange 40 that extends in a radial direction from the sleeve 36. Also, a notched track 42 is formed on the sleeve 36 along the periphery of the flange 40. Still referring to FIG. 3, it is seen that the pole 18 is formed with a cuff 44 that extends in a radial direction from the pole 18. It is also formed with an extension 46 that extends in an axial direction. Thus, when the extension 46 of pole 18 is received in the channel 38 of sleeve 36, the bearing surface 48 on sleeve 36 contacts the bearings 50 on cuff 44. At the same time, the sleeve 36 makes contact with the bearing 52 on extension 46. Further, in the combination of sleeve 36 and cuff 44, the track 42 engages with a drive gear 54. With this cooperation of structure, the sleeve 36 is able to rotate on the pole 18 around the central axis 24.

Along with the structure for mount 26 disclosed above, it is to be appreciated that a motor 56 is provided to operate the drive gear 54. Though motor 56 is shown mounted on the pole 18 in FIG. 3, it can be effectively placed at any convenient location. Further, a controller 58 is electronically associated with the motor 56 to conform its operation with a programmed schedule. Like the motor 56, the controller 58 can be conveniently located, as desired. An additional structural aspect of the apparatus 10 that is shown in FIG. 3 involves adjusters 60a and 60b that are respectively incorporated into the braces 30a and 30b. Specifically, if incorporated, the adjusters 60a,b can be manipulated to alter the inclination angle "α" of the solar panel 12. This can be done for any of several reasons (e.g. significant latitude requirements, or wind load compensation).

Figure 4:
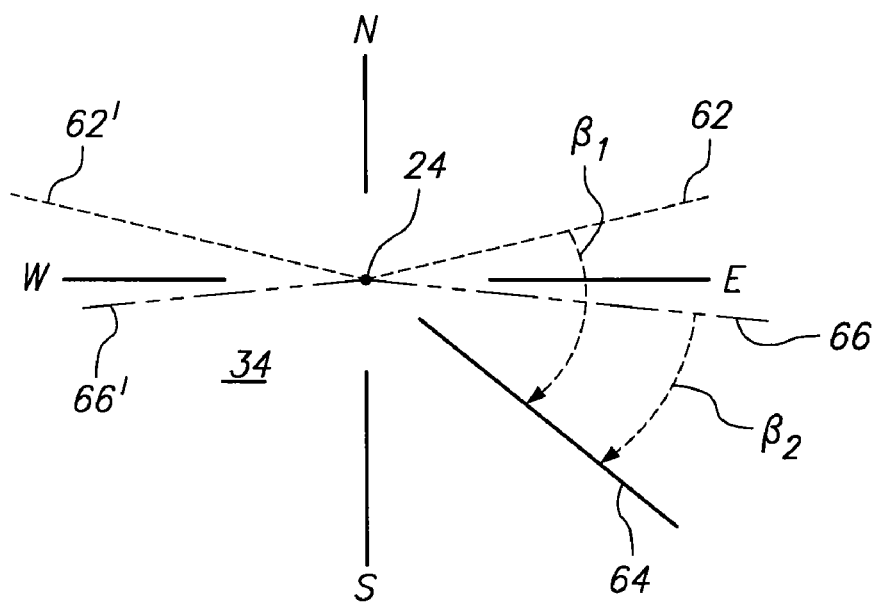
FIG. 4 is a schematic plan view of geometrical aspects shown in a horizontal plane for a programmed schedule in accordance with the present invention.

As implied above, the operation of an apparatus 10 is accomplished in accordance with a programmed schedule. In more detail, and with reference to FIG. 4, it will be seen that the operation of apparatus 10 is best described in its relationship with a compass rose in the horizontal plane 34. In accordance with FIG. 4, the programmed schedule can be considered as being a continuing succession of cycles, wherein each cycle pertains to a particular day in a year. For each day, a cycle will include a start point that corresponds with sunrise and a final point that corresponds with sunset. For example, the dashed line 62 represents the azimuth of the sun, as measured from the central axis 24, at sunrise on a given day. The dashed line 62' then represents the azimuth of the sun at sunset on that same day. During the particular day defined by dashed lines 62 and 62', as the sun moves after sunrise to an azimuth identified by the line 64, the azimuthal bearing will have changed by the angle $\beta_1$. On the other hand, for another day, the dash-dot line 66 represents the sun's azimuth at sunrise, and the dash-dot line 66' represents its azimuth at sunset. In this latter cycle, movement of the sun to the azimuth line 64 requires an angle change of $\beta_2$.

In accordance with the present invention, each day of the year will have a cycle (e.g. represented by lines 62-62' and 66-66'). Further, at the end of each day (e.g. line 62' or 66') the apparatus 10 will recycle during the night to a start line for the next immediately following day. As will be appreciated by the skilled artisan, the specific start line (i.e. azimuth) for each day will be determined with reference to a standard solar table. Most importantly, as the solar panel 12 is moved during a cycle, between sunrise and sunset, the position of the sun is maintained in the directional plane 22 of the solar panel 12.

While the particular Sun Tracking Solar Panels as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An apparatus for moving an energy converting unit to maximize solar energy utilization which comprises:
   at least one solar panel having a substantially flat surface with a plurality of the energy converting units mounted thereon;
   a mount for supporting the solar panel with the flat surface thereof inclined relative to a terrestrial horizon at a fixed angle "α" wherein the mount includes a pole anchored in the ground;
   a means for rotating the panel on the mount about a central axis, wherein the central axis is aligned with the pole and is substantially perpendicular to a horizontal plane defined by the terrestrial horizon; and
   a controller for controlling rotation of the panel through successive one-directional cycles in accordance with a programmed schedule to maximize generation of solar energy.

2. An apparatus as recited in claim 1 wherein the solar panel defines a directional plane, and wherein the directional plane is perpendicular to the flat surface of the solar panel and includes the central axis.

3. An apparatus as recited in claim 2 wherein for each cycle of the programmed schedule, the controller maintains the sun at a position substantially in the directional plane from sunrise to sunset in a day.

4. An apparatus as recited in claim 3 wherein the programmed schedule has a unique cycle for each day of a year, with each cycle having a start time established by sunrise, a time interval duration "Δt" extending from sunrise to sunset, and a recycle phase wherein the solar panel is returned after sunset to a start point for a subsequent cycle beginning at sunrise on an immediately following day.

5. An apparatus as recited in claim 1 wherein the fixed angle "α" is in a range of eight to thirty-five degrees (α=8° to 35°).

6. An apparatus as recited in claim 1 wherein each cycle is characterized by a predetermined angle of rotation "β" of rotation in the horizontal plane, and a pre-selected time interval duration "Δt", wherein the angle "β" provides a range for tracking the sun during "Δt", and "Δt" extends from sunrise to sunset of a day.

7. An apparatus as recited in claim 1 wherein a support point on the solar panel is positioned on the mount with the solar panel exerting a substantially zero moment on the mount in a "no-wind" condition.

8. An apparatus as recited in claim 7 wherein the pole has a base anchored to the ground, and an end extending upwardly therefrom, and wherein the means for rotating the panel comprises:
   a cuff attached to the pole, the cuff being formed with a first bearing surface;
   a sleeve formed with a channel for receiving the end of the pole therein, wherein the sleeve is formed with a second bearing surface for contact with the first bearing surface of the cuff; and
   a truss structure affixed to the solar panel and engaged with the sleeve to hold the solar panel, wherein the motor is positioned on the apparatus for moving the sleeve relative to the cuff to rotate the solar panel.

9. An apparatus as recited in claim 1 wherein the system comprises a plurality of solar panels and the energy converting units are selected from a group consisting of photovoltaic cells, solar-thermal cells, and concentrating cells.

10. An apparatus as recited in claim 1 further comprising:
    a means connected to the solar panel for storing electricity collected from the energy converting units;
    a means connected to the storing means for directing electricity from the storing means to a predetermined utility site;
    a means for interconnecting a plurality of solar panels to each other to establish an array thereof;
    a means for adjusting the angle "α"; and
    a means attached to the mount for moving the solar panel relative thereto to compensate for wind loads.

11. A system for collecting solar radiation to maximize solar energy utilization which comprises:
    a solar panel having a substantially flat surface, wherein the panel defines a central axis inclined at a fixed angle "α" relative thereto and a directional plane substantially perpendicular to the flat surface, with the directional plane including the central axis;
    a mount for supporting the solar panel, wherein the mount includes a pole anchored in the around with the pole connected to the solar panel and aligned with the central axis, and the solar panel exerts a substantially zero moment on the mount; and
    a motor for rotating the solar panel on the mount in one direction, in accordance with a programmed schedule, to maintain the sun at a position substantially in the directional plane from sunrise to sunset for each day of a year.

12. A system as recited in claim 11 wherein the angle "α" is equal to approximately ten degrees (α=10°).

13. A system as recited in claim 11 wherein the solar panel is substantially rectangular.

14. An apparatus for moving an energy converting unit to maximize solar energy utilization which comprises:
    a plurality of solar panels, with each solar panel having a substantially flat, rectangular shaped surface with a plurality of the energy converting units mounted thereon, wherein the solar panel defines a directional plane perpendicular to the flat surface of the solar panel and includes a central axis passing through a support point on the solar panel;
    a mount for supporting the solar panel with the flat surface thereof inclined relative to a terrestrial horizon at a fixed angle "a", wherein the fixed angle "a" is in a range of eight to thirty-five degrees (α=8° to 35°), and further wherein the support point on the solar panel is positioned on the mount with the solar panel exerting a substantially zero moment on the mount in a "no-wind" condition;
    a motor for rotating the panel on the mount about a central axis, wherein the mount includes a pole anchored in the ground, and wherein the central axis is aligned with the pole and is substantially perpendicular to a horizontal plane defined by the terrestrial horizon; and a controller for controlling rotation of the panel through successive one-directional cycles in accordance with a programmed schedule to maximize generation of solar energy, wherein during each cycle of the programmed schedule, the controller maintains the sun at a position substantially in the directional plane from sunrise to sunset in a day, and further wherein each cycle has a start time established by sunrise, a time interval duration "$\Delta t$" extending from sunrise to sunset, and a recycle phase wherein the solar panel is returned after sunset to a start point for a subsequent cycle beginning at sunrise on an immediately following day.

15. An apparatus as recited in claim 14 wherein the mount is a pole having a base anchored to the ground, and an end extending upwardly therefrom, and wherein the apparatus further comprises:

a cuff attached to the pole, the cuff being formed with a first bearing surface;

a sleeve formed with a channel for receiving the end of the pole therein, wherein the sleeve is formed with a second bearing surface for contact with the first bearing surface of the cuff; and a truss structure affixed to the solar panel and engaged with the sleeve to hold the solar panel, wherein the motor is positioned on the apparatus for moving the sleeve relative to the cuff to rotate the solar panel.

* * * * *

UNITED STATES PATENT AND TRADEMARK OFFICE
CERTIFICATE OF CORRECTION

| | | |
|---|---|---|
| PATENT NO. | : 7,705,277 B2 | Page 1 of 1 |
| APPLICATION NO. | : 12/025192 | |
| DATED | : April 27, 2010 | |
| INVENTOR(S) | : Robert L. Noble and William S. Adelson | |

It is certified that error appears in the above-identified patent and that said Letters Patent is hereby corrected as shown below:

Column 6, Line 31:
DELETE "around"
ADD     --ground--

Signed and Sealed this

Fourth Day of January, 2011

David J. Kappos
*Director of the United States Patent and Trademark Office*